US010482523B1

(12) United States Patent
Price et al.

(10) Patent No.: US 10,482,523 B1
(45) Date of Patent: Nov. 19, 2019

(54) METHODS AND SYSTEMS FOR PROVIDING PURCHASE RECOMMENDATIONS BASED ON RESPONSES TO INQUIRIES ON PRODUCT ATTRIBUTES

(71) Applicant: Capital One Services, LLC, McLean, VA (US)

(72) Inventors: Micah Price, Plano, TX (US); Qiaochu Tang, The Colony, TX (US); Jason Hoover, Grapevine, TX (US); Avid Ghamsari, Frisco, TX (US); Geoffrey Dagley, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/506,114

(22) Filed: Jul. 9, 2019

(51) Int. Cl.
*G06Q 30/06* (2012.01)
(52) U.S. Cl.
CPC .............................. *G06Q 30/0631* (2013.01)
(58) Field of Classification Search
None
See application file for complete search history.

(56) References Cited

U.S. PATENT DOCUMENTS

| 8,301,623 | B2 | 10/2012 | Chakrabarti | |
| 8,737,728 | B2* | 5/2014 | Bhardwaj | G06Q 30/0643 |
| | | | | 382/165 |
| 8,879,978 | B1* | 11/2014 | Barnhart | G09B 7/00 |
| | | | | 434/350 |
| 9,063,943 | B1* | 6/2015 | Smith | G06F 16/148 |
| 2013/0084000 | A1* | 4/2013 | Bhardwaj | G06Q 30/0643 |
| | | | | 382/165 |
| 2015/0095202 | A1* | 4/2015 | Subramanya | G06Q 10/087 |
| | | | | 705/28 |
| 2016/0307255 | A1* | 10/2016 | Izumo | G06Q 30/0631 |
| 2018/0143978 | A1* | 5/2018 | Chang | B60N 2/2806 |

FOREIGN PATENT DOCUMENTS

WO    WO-0190995 A2 * 11/2001 ............. G06Q 30/02

OTHER PUBLICATIONS

Wikipedia contributors, "Entropy (information theory)," Wikipedia, The Free Encyclopedia, https://en.wikipedia.org/w/index.php?title=Entropy_(information_theory)&oldid=901490955 (accessed Jun. 27, 2019).

* cited by examiner

*Primary Examiner* — Nicholas D Rosen
(74) *Attorney, Agent, or Firm* — Bookoff McAndrews, PLLC

(57) ABSTRACT

Systems and methods are disclosed for providing purchase recommendations. According to some examples, a method may include: determining respective frequency distributions of a plurality of vehicle attributes, the frequency distributions being determined based on occurrences of values of the plurality of vehicle attributes in a set of vehicles; selecting a vehicle attribute from the plurality of vehicle attributes based on the frequency distributions of the plurality of vehicle attributes; transmitting, to a user device, an inquiry for user preference regarding the selected vehicle attribute; receiving, from the user device, a response indicating the user preference; and presenting, to the user device, a recommendation of one or more vehicles determined based on the received response.

20 Claims, 10 Drawing Sheets

METHODS AND SYSTEMS FOR PROVIDING PURCHASE RECOMMENDATIONS BASED ON RESPONSES TO INQUIRIES ON PRODUCT ATTRIBUTES

TECHNICAL FIELD

Various embodiments of the present disclosure relate generally to methods and systems for providing product recommendations to users and, more particularly, to artificial intelligence-based methods and systems for providing vehicle recommendations to users.

BACKGROUND

When shopping online, consumers may be presented with large lists of products to choose from. For example, when shopping for a vehicle at a website of an automobile dealer or an aggregator of inventory listings, a consumer may need to sort through large inventory lists to find vehicles with a desired set of characteristics. Furthermore, different websites may vary in the manner in which product inventories are presented. Therefore, a consumer may find certain online shopping interfaces to be difficult or cumbersome to use.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for providing product recommendations.

For instance, a method may include: determining respective frequency distributions of a plurality of vehicle attributes, the frequency distributions being determined based on occurrences of values of the plurality of vehicle attributes in a set of vehicles; selecting a vehicle attribute from the plurality of vehicle attributes based on the frequency distributions of the plurality of vehicle attributes; transmitting, to a user device, an inquiry for user preference regarding the selected vehicle attribute; receiving, from the user device, a response indicating the user preference; and presenting, to the user device, a recommendation of one or more vehicles determined based on the received response.

Furthermore, a computer system may include a memory storing instructions and one or more processors configured to execute the instructions to perform operations. The operations may include: determining respective estimates of normalized entropy of a plurality of vehicle attributes of vehicles in a set of vehicles; selecting a vehicle attribute from the plurality of vehicle attributes based on the estimates of normalized entropy; transmitting, to a user device, an inquiry for user preference regarding the selected vehicle attribute; receiving, from the user device, a response indicating the user preference; and presenting, to the user device, a vehicle recommendation determined based on the received response.

Furthermore a computer system, for implementing an artificial-intelligence interactive agent for determining vehicle recommendations based on user interaction, may include a memory storing instructions and one or more processors configured to execute the instructions to perform operations. The operations may include: determining respective frequency distributions of a plurality of vehicle attributes describing vehicles in a set of vehicles, the frequency distributions being determined based on occurrences of values of the plurality of vehicle attributes in the set of vehicles; determining respective estimates of normalized entropy of the plurality of vehicle attributes based on the respective frequency distributions; selecting a vehicle attribute from the plurality of vehicle attributes based on the respective estimates of normalized entropy; transmitting, to a user device, an inquiry for user preference regarding the selected vehicle attribute; receiving, from the user device, a response indicating the user preference; and transmitting, to the user device, a web page including a list of one or more vehicles from the candidate set, the list having filters set in accordance with the user preference.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

Additional aspects and examples will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6 depicts an example of an interface for presenting one or more vehicle recommendations, according to one or more embodiments.

DETAILED DESCRIPTION OF EMBODIMENTS

Figure 1:
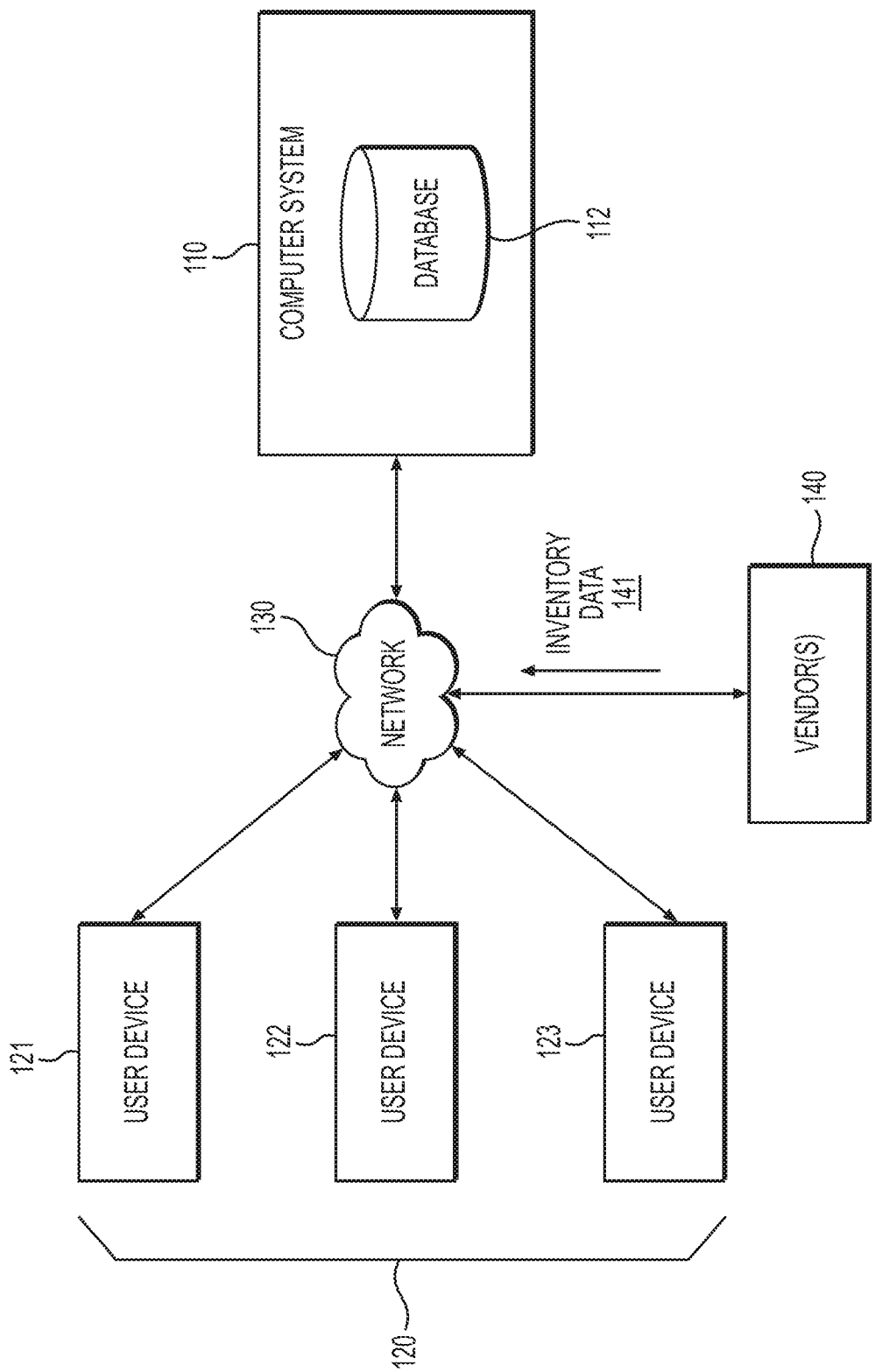
FIG. 1 depicts an exemplary system infrastructure in which a computer system for providing vehicle purchase recommendations may be implemented, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. Various embodiments of the present disclosure relate generally to methods and systems for providing product recommendations.

As will be discussed in more detailed below, in certain embodiments, an interactive feature, such as a chatbot, may ask a user a series of questions, each pertaining to user preference in regard to a certain product attribute. In the context of automotive retailing, the product attribute may be a vehicle attribute, such as body style, exterior color, or price. If the question pertains to body style, for example, the user may reply by indicating the type of body style (e.g., sedan, coupe, SUV, etc.) he or she desires. By asking such questions, it becomes possible to narrow down a candidate set of vehicles based on the user's response to the questions. Once the candidate set of vehicles has been narrowed down, a vehicle recommendation may be made based on the narrowed-down set of vehicles.

In order to construct a series of questions that is efficient in eliciting the most amount of information from the user using the fewest number of questions, the topics of the questions (e.g., the vehicle attribute, for the automotive retailing context) should be selected by a methodology that that tends to maximize efficiency. In some embodiments, normalized entropy is respectively estimated for a plurality of vehicle attributes, and a particular vehicle attribute having a high estimated normalized entropy is selected from the plurality of vehicle attributes. By selecting a vehicle attribute having a high estimated normalized entropy and asking a question regarding such a vehicle attribute, a user's response to the question would likely narrow down the candidate set of vehicles more so than if the question had pertained to a vehicle attribute having a low estimated normalized entropy. When presented with the question, the user may respond with a selection of one or more values of the attribute (e.g., one or more types of body style).

FIG. 1 shows an environment in which a computer system for providing vehicle purchase recommendations may be implemented. The environment may include a computer system 110 connected to a plurality of user devices 120, such as user devices 121, 122, and 123, over a network 130. The computer system 110 may also be connected to computer systems of one or more vendors 140 through network 130. The network 130 may be a public network (e.g., the internet), a private network (e.g., a network within an organization), or a combination of public and private networks. User devices 120 may each be a computer system, such as a laptop or desktop computer, or a mobile computing device such as a smartphone or tablet.

The computer system 110 may have one or more processors configured to perform various processes related to determining one or more product recommendations for a user, as will be discussed in more detail below. In some embodiments, computer system 110 may be a server system, in which case the user devices 120 may be referred to as client devices that use a service provided by the computer system 110. In such examples, user devices 120 may interact with the computer system 110 through an application installed on the user devices 120, such as a web browser, a web browser extension, or a mobile app. In some examples, the computer system 110 may have a cloud computing platform with scalable resources for computations and/or data storage, and may run one or more applications on the cloud computing platform to perform various computer-implementable processes described in this disclosure.

The one or more vendors 140 may each be a party that sells, leases, or otherwise supplies products to users of the user devices 120. The computer system 110 may have access to inventory data 141 provided by the one or more vendors 140. Inventory data 141 may include inventory lists of products offered for sale or sold by the one or more vendors 140. In some examples, the computer system 110 may aggregate inventory lists of multiple vendors 140 into an aggregated inventory list that is stored in database 112 of the computer system 110. The aggregated inventory list may include information pertaining to the products offered for sale or stocked by the vendors 140. Such information may include values of one or more attributes of the products.

The environment shown in FIG. 1 may be applied to the automotive retailing industry. In the automotive retailing industry, the products described above may be vehicles and the vendors 140 may include any party that sells or supplies such vehicles, such as car dealers. The users of the user devices 120 may include consumers such as individual persons seeking to buy automobiles. In some examples, computer system 110 may be operated by a party that assists users in purchasing a vehicle. For example, the computer system 110 may be operated by a lender that offers car loans to consumers and desires to assist borrowers in finding a vehicle. However, in general, the computer system 110 may be operated by any party that stores a list of products. In some examples, the computer system 110 may be operated by a vendor 140, in which case the list of products stored in database 112 may include only products sold by the vendor 140 operating the computer system 110.

The computer system 110 may collect inventory data 141 including information describing vehicle inventories of one or more vendors 140, and store the information in database 112. In the context of the automotive retailing industry, such information may include values of one or more vehicle attributes. Examples of vehicle attributes include make, model, body style, exterior color, interior color, number of doors, the vehicle condition, engine type, transmission type, fuel type, drive type, mileage, price, year, certain features (e.g., type of seats, availability of backup camera, etc.), and fuel economy (e.g., a highway miles-per-gallon rating, a city miles-per-gallon rating, or a combined miles-per-gallon rating). As used herein, the term "attribute" refers to any specification that defines a property of an object such as a vehicle, and the term "attribute value" or "value" (of an attribute) refers to the specific data populating such an attribute. For example, different cars may be defined using the same attribute (e.g., exterior color) and have different values (e.g., blue) for that attribute. The same value (e.g., blue) may exist for different attributes (e.g., exterior color and interior color).

Certain attributes may be represented as categorical variables. An attribute represented as a categorical variable may be referred to as a categorical attribute. For example, the attribute of vehicle condition may take on values that represent the categories of new vehicles and used vehicles. Other examples of attributes that may be represented as categorical variables include, but are not limited to: make; model; body style (whose value may represent, for example, convertible, coupe, hatchback, sedan, sports utility vehicle (SUV), truck, minivan, van, and/or wagon); exterior color; interior color; number of doors; engine type (whose values may represent, for example, 3 cylinders or less, 4 cylinders, 5 cylinders, 6 cylinders, 8 cylinders, 10 cylinders or more, and/or electric), transmission type; fuel type (whose values may represent, for example, diesel, electric flexible-fuel, gasoline, and hybrid); drive type; and attributes pertaining to car features (for example, if the car feature is whether the car has a backup camera or heated seats, the values may be yes or no). The value of categorical attributes may be stored in any format, including numerical or string representations. Additionally, the computer system 110, when assembling the list of vehicles to be stored in the database 112, may process information from the vendors 140 so that an attribute is assigned. For example, the computer system 110 may assign a single value representing silver for different shades of silver used by different vehicle manufacturers. Categories represented by values of a categorical attribute may also be referred to as classes.

Certain attributes may be represented as quantitative variables. An attribute represented as a quantitative variable may be referred to as a quantitative attribute. A quantitative variable may be a continuous quantitative variable or a discrete quantitative variable. Examples of attributes that may be represented as quantitative variables include mileage, price, year, and fuel economy. A quantitative variable may have ordinal values that can be ordered from low to high. Thus, a group of values of a quantitative variable may be characterized by metrics such as a mean or median value. A quantitative variable may have any suitable number of decimal places, if any, or other manner of discretization. For example, the variable of vehicle year may have discretized values such as 2018, 2019, and 2020, etc.

It is noted that certain attributes may be represented as either a quantitative variable or categorical variable, and the representation of such attributes may depend on the desired implementation. For example, the attribute of year may be represented as either a quantitative variable or a categorical variable, depending on the desired implementation.

Figure 2:
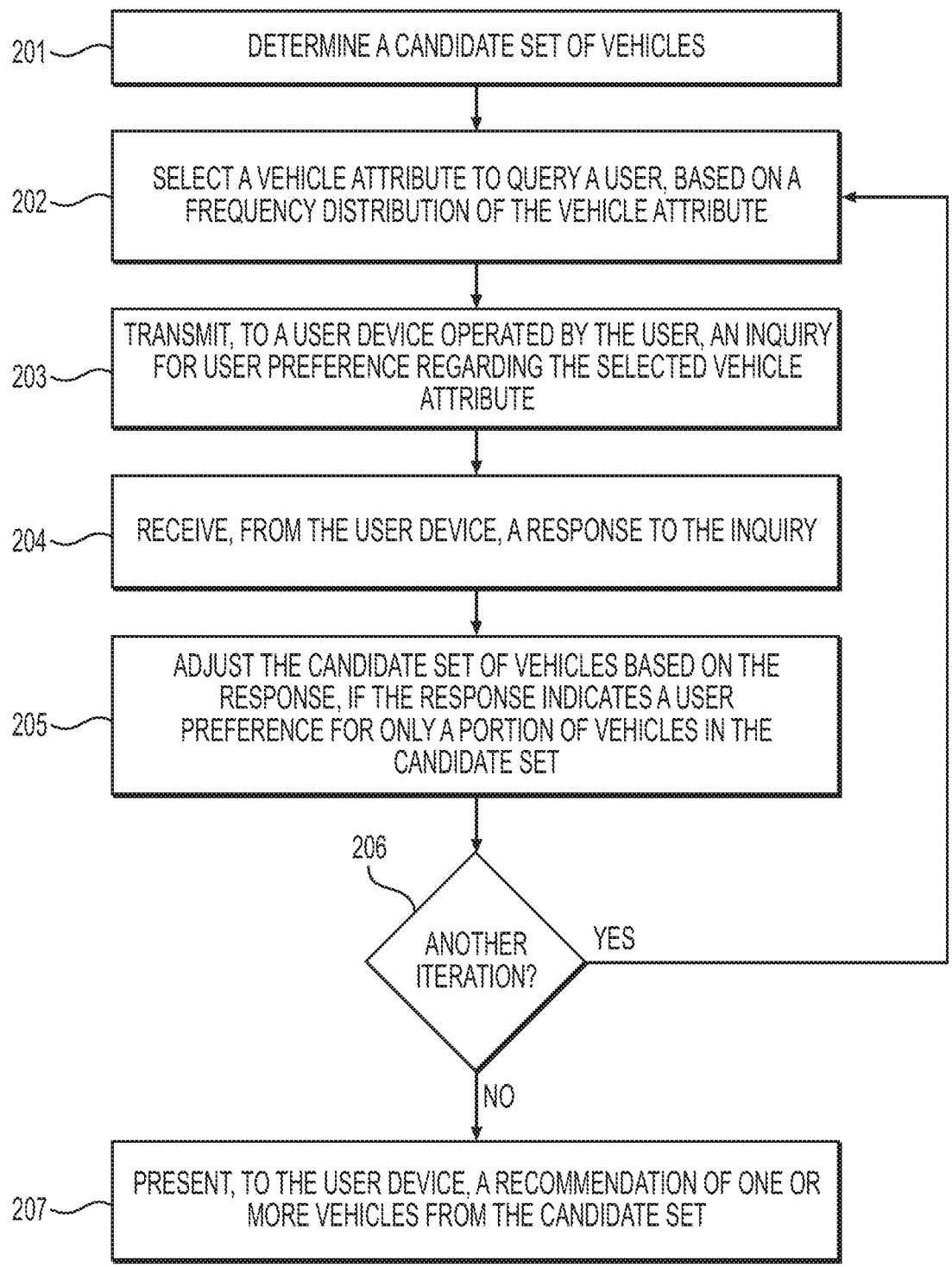
FIG. 2 depicts a method for providing vehicle recommendations to users, according to one or more embodiments.

FIG. 2 depicts a method for determining one or more vehicle recommendations based on user interaction, according to one or more embodiments of this disclosure. A vehicle may be described by various attributes, as described above, and a user may have preferences regarding such attributes. The method depicted in FIG. 2 includes a methodology for selecting the order of attributes to ask a user about.

The method depicted in FIG. 2 may be performed by computer system 110. In some examples, the method may be performed as part of a user-interaction service for recommending vehicles, such as a service that uses an artificial intelligence agent to interact with a user. The method depicted in FIG. 2 may involve a user of any one of the user devices 120. In the following descriptions, user device 121 is used as an example of the user device.

Step 201 may include determining a candidate set of vehicles. The candidate set of vehicles may be a subset of a base set of all vehicles stored in database 112. In some examples, the candidate set is selected based on user geography. For example, the computer system 110 may aggregate information on vehicles over multiple geographical regions into a base set of vehicles. Therefore, in order to provide a vehicle recommendation for a particular user, the computer system 110 may first determine the location of the user, and select the candidate set of vehicles as vehicles, selected from the base set, that are located at venues within a certain geographical distance from the user. The location may be determined based on, for example, a user input transmitted from user device 121 of the user to the computer system 110, an internet protocol address of the user device 121, or some other information available to the computer system 110. The geographical distance may be input by the user or have a default value adjustable by the user.

In some implementations, the candidate set of vehicles may be based on user interactions. For example, the computer system 110 may present a series of preliminary questions to user device 121 to ask about preferences. The user's response may then be used to select the candidate set of vehicles in step 201. For example, if the preliminary questions asks a user about a desired vehicle make, and the user responds with a certain vehicle make, then the computer system 110 may narrow the base set to vehicles, within a certain geographical distance from the user, that are of the indicated make.

Step 202 may include selecting a vehicle attribute to query the user, based on a frequency distribution of the vehicle attribute. The vehicle attribute selected in this step is to be the topic of a question for the user. This step may include determining a set of vehicle attributes from which a particular vehicle attribute is to be selected, determining a frequency distribution of each vehicle attribute in the set of vehicle attributes, and selecting the particular vehicle attribute from the set of vehicle attributes based on the frequency distributions. The set of vehicle attributes may be determined as the set of vehicle attributes that are represented in the candidate set of vehicles. In some embodiments, the selection may be based on a computation of entropy values for the vehicle attributes in the set of vehicle attributes.

Steps 202 through 205 may be an iterated process that is performed multiple times, such that in each iteration, a different vehicle attribute is selected in step 202. As will be described below, the candidate set of vehicles and/or the set of attributes from which a particular vehicle attribute is to be selected may be adjusted after each iteration.

Figure 3:
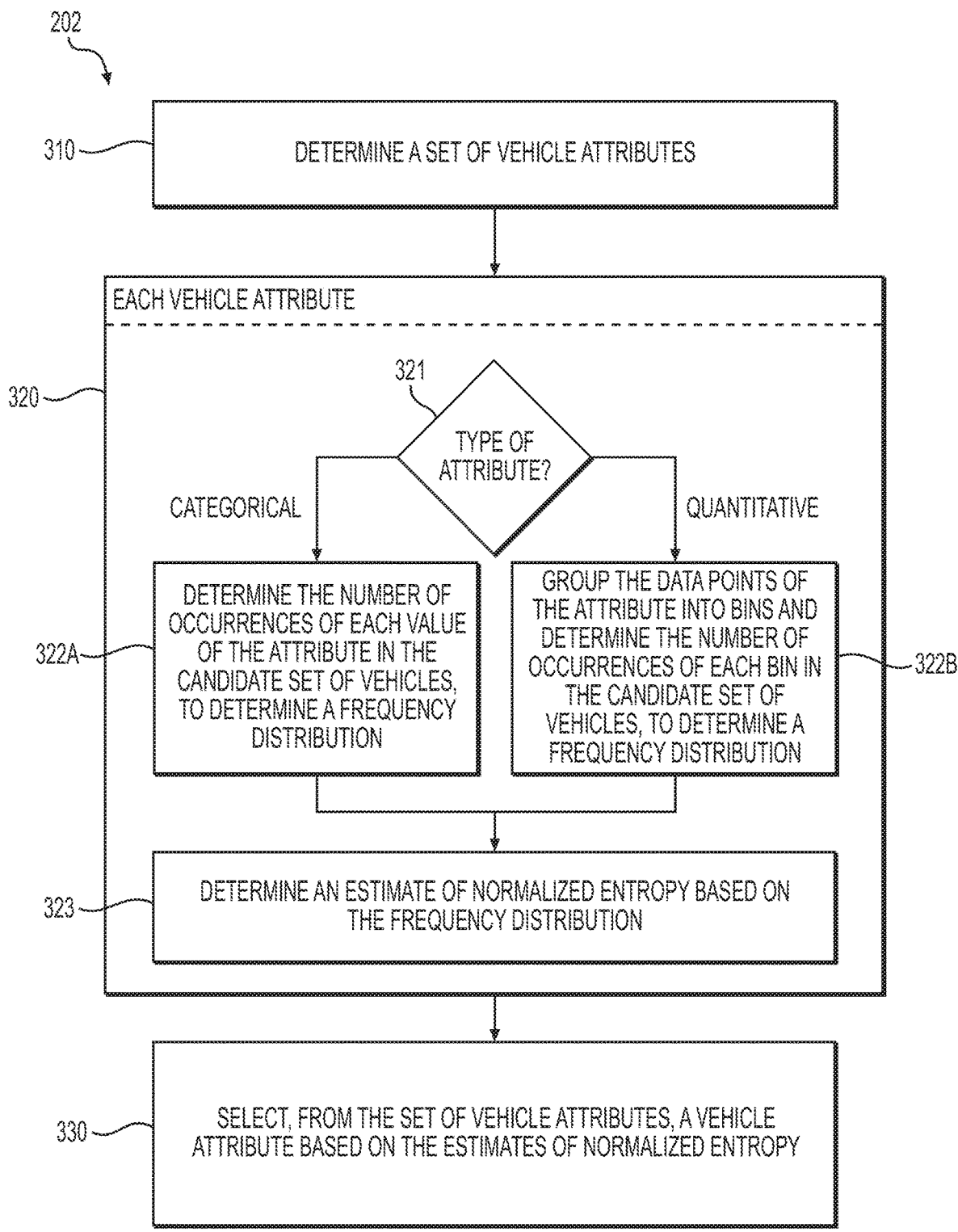
FIG. 3 depicts a method for selecting a vehicle attribute, according to one or more embodiments.

FIG. 3 depicts a method of performing step 202 that involves computation of entropy values for the vehicle attributes in the set of vehicle attributes. Any step that is part of the method depicted in FIG. 3 may be implemented as a sub-step of step 202 of FIG. 2.

Step 310 may include determining a set of vehicle attributes. In some examples, the set of vehicle attributes may be a default set of vehicle attributes pre-configured to include all possible vehicle attributes that a user may be asked about. However, it is also possible to construct the set of vehicle attributes based on evaluation of the candidate set of vehicles. For example, during the first iteration of steps 202 through 205, the candidate set of vehicle attributes may constructed to include any vehicle attribute that is used to characterize vehicles in the candidate set of vehicles. For each subsequent iteration, the set of vehicle attributes may be reduced so as to omit the vehicle attribute that was selected in step 202 of the previous iteration.

Box 320 represents a normalized entropy computation process that may be performed for each vehicle attribute in the set of vehicle attributes. Different instances of the process, respectively performed for different vehicle attributes, may be performed sequentially or in parallel. Step 321 may include determining a type of attribute for the particular attribute that is being evaluated. Depending on whether the attribute being evaluated is categorical or quantitative, step 322A or step 322B may be performed to calculate a frequency distribution for that attribute.

The frequency distribution in step 322A or 322B describes the number of times a value (or group of values, such as a bin of values) occurs in data points of the candidate set of vehicles, for each value (or each group of values) in a certain set of values (or in a certain set of groups of values). The number of occurrences of a value in a data set may also be referred to as a "frequency" of that value. A frequency distribution of the values of an attribute may also be referred to as a histogram of the attribute. In this disclosure, the term histogram is not limited to histograms for binned quantitative variables.

If the attribute in step 321 is a categorical attribute, then the process may proceed to step 322A, which may include determining the number of occurrences (also referred to as the "frequency") of each value of the attribute in the candidate set of vehicles, to determine a frequency distribution for values of the categorical variable.

If the attribute is a quantitative attribute, then process 320 may proceed to step 322B, which may include grouping the data points of the attribute into bins and determining the number of occurrences (also referred to as the "frequency") of each bin in the candidate set of vehicles, to obtain a frequency distribution for the bins. In this context, an occurrence of a bin in the candidate set of vehicles may be the occurrence of any value within the bin in the candidate set of vehicles. The grouping of data points into bins may be performed in order to discretize the different values of the data points of the attribute, for purposes of calculating entropy, as described below. The number of bins and the size of the bins may depend on the circumstances and/or desired implementation. For example, for a given vehicle attribute subject to step 322B, the number of bins and the size of bins may be determined automatically based on statistical characteristics of the set of data points of the attribute in question (e.g., variance) and/or configured manually. For a given vehicle attribute, the size of the bins may be the same for all bins, but it is also possible for the bins to be of differing sizes. As used herein, the term "bin" is interchangeable with "bucket."

A bin may include one or more values. If the set of data points of the attribute is sufficiently discretized and/or the number of different values in the set of data points is small, it is possible for the bins to represent single values rather than ranges of values, in which case step 322B may be performed in a manner similar to step 322A for categorical attributes. For example, if the attribute of vehicle year is represented as a discrete quantitative attribute having only whole numbers as possible values, then each bin may be a single year, especially if the number of the different values for vehicle year is relatively small. On the other hand, if the values in the set of data points are not highly discretized, then each bin may be a range of values.

In some implementations, the set of data points of one or more quantitative attributes may be subject to outlier processing. Such processing may be performed prior to grouping the data points into bins in step 322B, in order to prevent outlier data points from biasing the distribution for the subsequent calculation of entropy. In some implementations, the data points of the attribute in question may be capped so as to not exceed an upper-bound limit and/or capped so as to be not below a lower-bound limit. The upper-bound limit and/or the lower-bound limit may be determined automatically, based on statistical characteristics of the set of data points of the attribute in question (e.g., upper and lower percentile values), and/or configured manually. The capping operation described above may include replacing values that are higher than the upper-bound limit and lower than the lower-bound limit with the respective values of the upper-bound limit and the lower-bound limit. Whether or not an attribute is to be subject to outlier processing may be determined based on automatic processes (e.g., outlier detection techniques) or based on manually-configured settings for specific attributes.

As an example to illustrate the methodologies described above, the attribute of price may have data points in the candidate set of vehicles that are outliers. Such outliers may correspond to vehicles in the inventory of a certain vendor that have an unusually high or unusually low price. The computer system performing step 322B may determine that price is an attribute that is subject to outlier processing, and may compute the $5^{th}$ and $95^{th}$ percentile values of price in the set of vehicles. Subsequently, data points having a value of price that is below the $5^{th}$ percentile value may be set to the $5^{th}$ percentile value, and data points having a value of price that is above the $95^{th}$ percentile value may be set to the $95^{th}$ percentile value.

Furthermore, after the data points have been grouped into bins, an additional processing step may be performed, in which bins that are substantially empty (e.g., having a low number of occurrences as compared to other bins) may be removed for purposes of the calculation of entropy.

Step 323 may include determining an estimate of normalized entropy based on the frequency distribution calculated in step 322A or 322B.

In general, the entropy, S, of a discrete random variable X having possible values $x_1, \ldots, x_n$ may be computed according to the following expression:

$$S(X) = -\sum_{i}^{n} P(x_i) \log_b P(x_i)$$

P(X) is the probability mass function, such that $P(x_i)$ is the probability for $X=x_i$, and "b" is an arbitrary logarithm base (e.g., b=2, 10, or e). Various examples in this disclosure generally use b=2. However, it is understood that the disclosure is not so limited and that other values of b may be used without departing from the scope of this disclosure.

The normalized entropy, $\eta(X)$, may be calculated according to any of the definitions in the following expression:

$$\eta(X) = \frac{S(X)}{\log_b(n)} = -\sum_{i}^{n} \frac{P(x_i) \log_b P(x_i)}{\log_b(n)} = \log_n\left(\prod_{i=1}^{n} P(x_i)^{-P(x_i)}\right)$$

In information theory, normalized entropy is also known as "efficiency." In this disclosure, the term "normalized entropy" is generally used to refer to the information theory concept expressed above. Depending on context, the term "efficiency" (and similar terms) may have a different or more generalized meaning. For example, a series of questions may be regarded as having high efficiency if it elicits a high amount of information from the user using a low number of questions.

In applying the above expressions to vehicle attributes, the variable "X" may represent any categorical or quantitative vehicle attribute. P(X) may represent the probability mass function for the user's preference for the vehicle attribute X. The values $x_1, \ldots, x_n$ may therefore correspond to values of a categorical attribute, or the bins of a quantitative variable. Accordingly, the probability $P(x_i)$ may represent, for example, the probability that the user wishes to purchase or shop for vehicles of a certain characteristic represented by attribute value $x_i$.

In some implementations, a form of the frequency distribution that is normalized to sum to 1 may be used as the probability mass function P(X). In such implementations, the frequency distribution calculated in step 322A or 322B for a particular vehicle attribute may be normalized for use in step 323 to obtain a normalized frequency distribution that is normalized to sum to 1, and such normalized frequency distribution of the attribute may be used as a proxy for the probability mass function for the user's preference for that attribute. Such a normalized distribution may be referred to as a percentage distribution describing the percentage of each value (or groups of values) among all values (or all groups of values) in the candidate set of vehicles. A normalized frequency distribution may also be referred to as a relative frequency distribution.

In serving as a proxy for the probability mass function for the user's preference for an attribute, the corresponding normalized frequency distribution may be treated as an estimate of the probability mass function for purposes of computing entropy and normalized entropy. For example, if the candidate set of vehicles includes 1000 total vehicles, consisting of 300 SUVs, 120 coupes, and 580 sedans, the percentages of the attribute of "body style" would be 30% for "SUV", 12% for "coupe," and 58% for "sedan." Accordingly, if these percentages are used as probabilities for purposes of calculating entropy, then the entropy S (in bits) may be calculated according to the following expression:

$$S = -(0.3)\log_2(0.3) - (0.12)\log_2(0.12) - (0.58)\log_2(0.58) = 1.34.$$

Since there are n=3 total values for the attribute of "body style", the normalized entropy is $\eta = S/\log_2(3) = 0.848$. In this example, a normalized frequency distribution of an attribute of a sample of cars that are available for purchase is used as an approximation for the probability distribution of the customer's desired attributes.

The normalized frequency distribution of an attribute may be used as a proxy for, and an estimate of, the probability mass function based on the assumption that the amount of inventory for a certain vehicle characteristic tends to correlate with consumer needs for that vehicle characteristic, and hence the tendency of a user to purchase a vehicle having that vehicle characteristic. In this disclosure, the term "estimate of entropy" and the term "estimate of normalized entropy" may respectively refer to a value of entropy and a value of normalized entropy calculated based on an estimate of the probability mass function. As noted above, a proxy variable, such as a percentage distribution in the form of the aforementioned normalized frequency distribution, may serve as an estimate of the probability mass function.

For categorical attributes, the list of n values $x_1, \ldots, x_n$ may include all values that appear in the candidate set of vehicles for a particular categorical attribute in question. In some implementations, the list of n values $x_1, \ldots, x_n$ may further include values that are possible but that do not appear in the candidate set. Such values may be referred to as empty classes. For example, continuing with the above example of a candidate set of 1000 total vehicles, the attribute of "body style" may have other possible values besides "SUV", "Sedan", and "Coupe", but none of these other possible values for body style actually appear in the set of 1000 total vehicles. However, the inclusion of empty classes would increase "n", so as to increase the normalization factor $\log_2(n)$ in the computation of normalized entropy. Therefore, in some implementations, empty classes may be excluded from the list of n values. In such implementations, empty classes would not affect the value of "n" in the normalization factor $\log_2(n)$, since values for empty classes would not be counted among the values of $x_1, \ldots, x_n$.

FIGS. 4A through 4H are charts that illustrate the normalized frequency distributions and the corresponding estimates of normalized entropy for various vehicle attributes, for a candidate set of vehicles. The titles of the charts display the name of the attribute ("vehicle condition", "transmission", "year", "exterior color", "body style", "price", "mileage", and "combined mpg"), and the respectively computed estimate of normalized entropy is displayed next to the attribute name. The horizontal bars represent the percentages for each value or bin, wherein the percentages sum to 1.

Figure 4A:
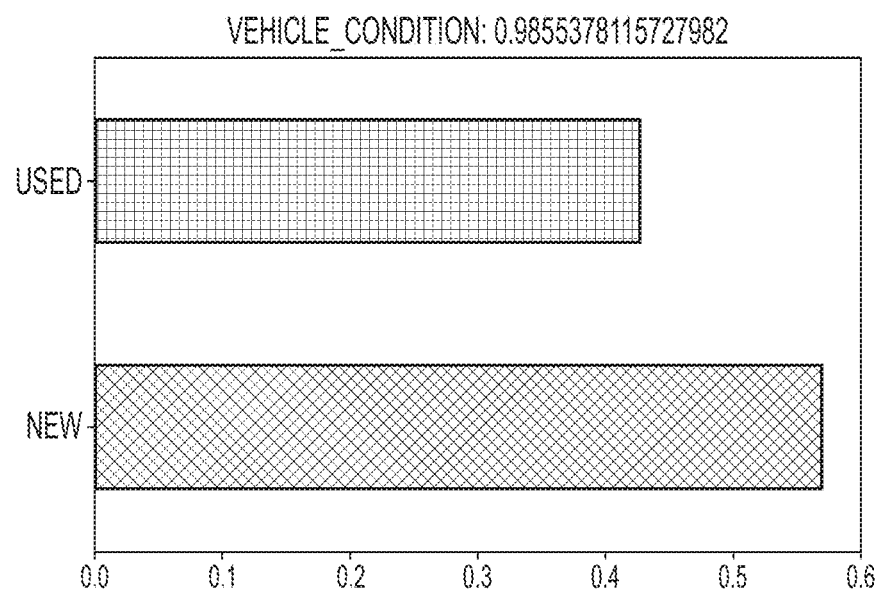
FIGS. 4A-4H illustrate examples of normalized frequency distributions and normalized entropy for various vehicle attributes represented in a set of vehicles, according to according to one or more embodiments.
Figure 4B:
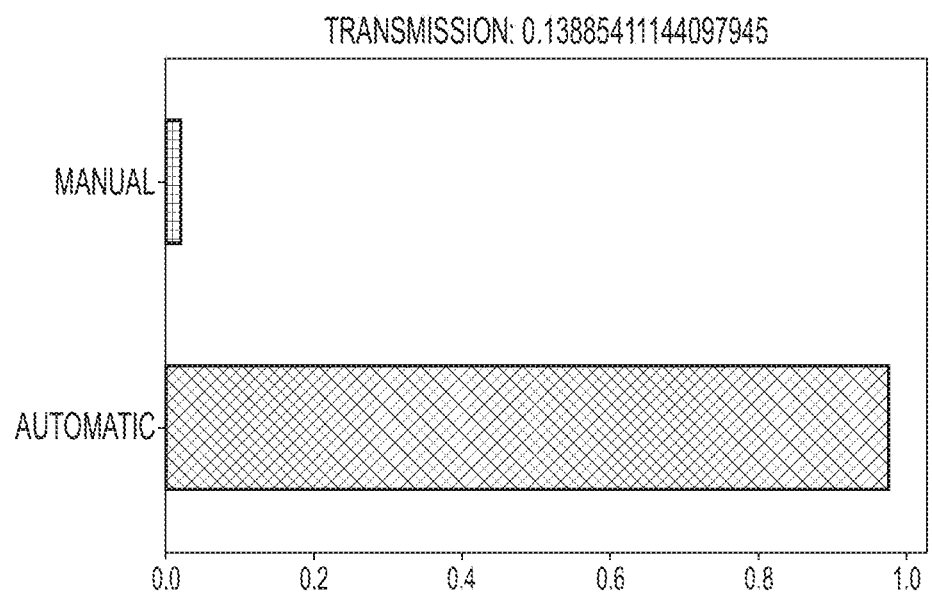

Referring to FIGS. 4A and 4B, for example, it is shown that, in the candidate set of vehicles, the frequency distribution for the attribute of "vehicle condition" is more uniformly distributed than the frequency distribution for the attribute of "transmission." Under the assumption that the percentage of an attribute value in the candidate set of vehicles represents the probability of a user in purchasing a vehicle having that attribute value, asking a question on vehicle condition (e.g., "What vehicle condition are you looking for?") may be more effective than asking a question on vehicle transmission (e.g., "What vehicle transmission are you looking for?") for purposes of narrowing down the candidate set of vehicles. In this circumstance, there is relatively high certainty that a typical user would prefer automatic transmission over manual transmission (as indicated by low entropy), whereas there is relatively low certainty that a typical user would prefer either used or new (as indicated by high entropy). Therefore, based on the premise that questions asked should prioritize less-certain choices over more-certain choices, asking the question on vehicle condition may be more effective than asking the question on vehicle transmission. Therefore, as will be discussed in more detail below in relation to step 330, it may be beneficial to select attributes that have relatively high entropy for purposes of asking a question to a user.

Figure 4C:
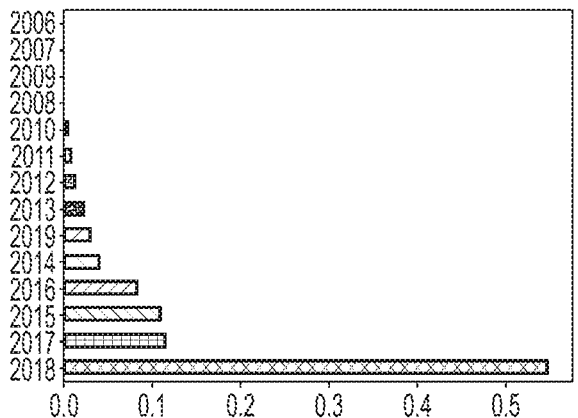

FIGS. 4C to 4H show additional examples of normalized entropy. FIG. 4C, for example, shows the estimated normalized entropy for the attribute of year. In general, the vehicle attribute of year may be represented as either a categorical or quantitative attribute, depending on the desired implementation. In the instant example of FIG. 4C, year is represented as a categorical attribute, with possible values of 2006 to 2018 as shown. In the instant example, empty classes corresponding to values of 2006, 2007, 2009, and 2008 are included in the count for n, for a normalization factor, $\log_2(n)$, of 3.8074 using n=14. If the four empty classes are removed from the count of "n," then the normalization factor would instead be 3.3219, using n=10, which would correspond to a normalized entropy of 0.6764 rather than 0.5901.

Figure 4D:
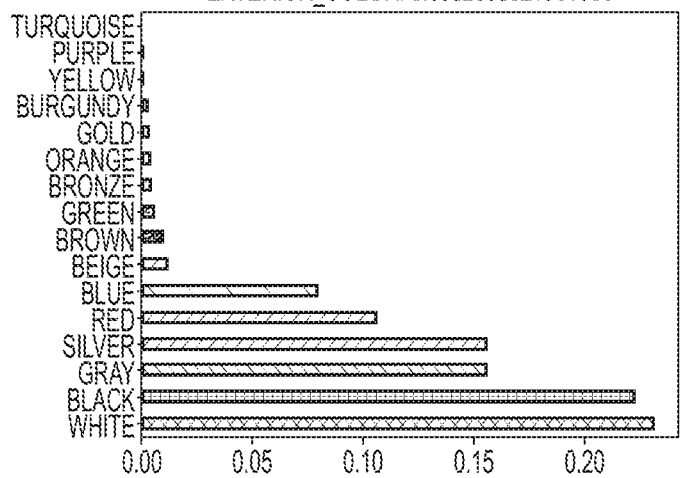
Figure 4E:
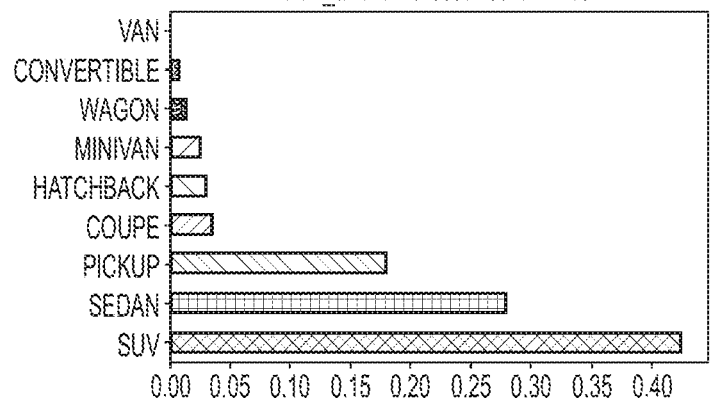
Figure 4F:
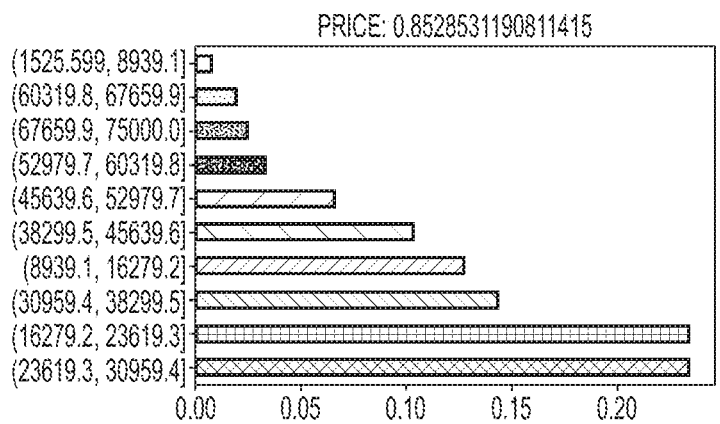
Figure 4G:
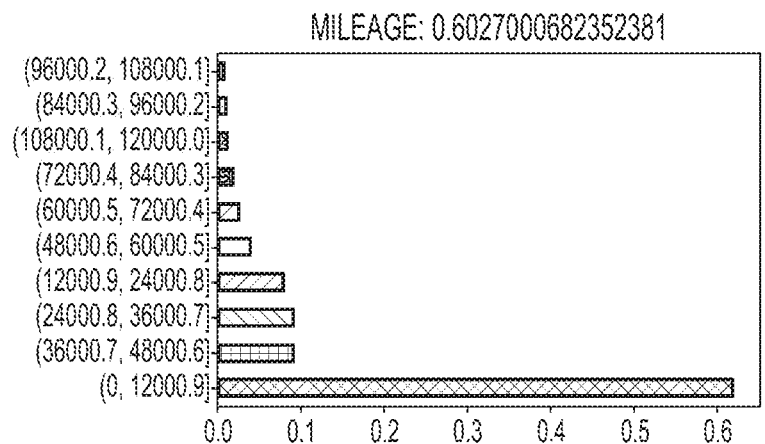
Figure 4H:
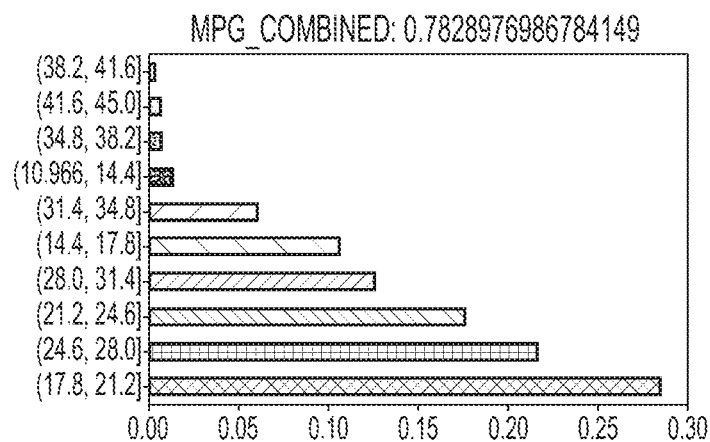

FIGS. 4D and 4E show frequency distributions and corresponding estimates of normalized entropy for additional categorical attributes, namely exterior color (FIG. 4D) and body style (FIG. 4E). As in the case of FIG. 4A, empty classes, such as "turquoise" and "van," may be removed for purposes of the normalization factor, if desired. FIGS. 4F to 4H show frequency distributions and corresponding estimates of normalized entropy for quantitative attributes of price, mileage, and combined miles-per-gallon. The data of such attributes may be subject to outlier processing as described above.

As shown in FIGS. 4A to 4H, the use of normalized entropy permits different attributes to be compared with one another, even if they differ in the number of values or bins.

Returning to FIG. 3, step 330 may include selecting, from the set of vehicle attributes, a vehicle attribute based on the values of normalized entropy. In some examples, the selection may be based on the values of normalized entropy alone. In such examples, step 330 may select the vehicle attribute whose respectively calculated normalized entropy is highest among all vehicle attributes in the set of vehicle attributes. For example, among the attributes shown in FIGS. 4A to 4H, the attribute of "vehicle condition" has the highest estimate of normalized entropy (0.9855). Therefore, if the selection methodology is based on the highest estimate of normalized entropy, then the attribute of "vehicle condition" would be selected over the other attributes shown in FIGS. 4A to 4H for the illustrated set of vehicle attributes.

In some examples, step 330 may select a vehicle attribute based on a combination of factors that includes the value of normalized entropy along with one or more additional factors, such as weights, randomization factors, and/or other factors. For example, the computer system performing step 330 may calculate an index as a function of the estimate of normalized entropy and the one or more additional factors, and select the attribute based on the order of the values, among the different attributes, for the index. The one or more additional factors may include tiebreaker factors, such as a default order when the aforementioned index is the same for different attributes. The one or more additional factors affecting selection may be the same or different for different iterations of steps 202 through 205 of FIG. 2.

For example, the respective normalized entropy values of the vehicle attributes in the candidate set of vehicle attributes may be multiplied or offset by respective weights. Such weights may be set so as to represent relative preferences for certain attributes over others, or to otherwise make adjustments to the calculated normalized entropy. For example, attributes that are favored for selection may have their normalized entropy increased by 0.1 or 10%, while attributes that are not favored for selection may have their normalized entropy reduced by 0.1 or 10%. Randomization factors, such as an increase or decrease of the normalized entropy by a random value or percentage, may be implemented in the manner of weights.

By use of additional factors such as weights, an attribute with a calculated normalized entropy that is slightly lower than that of another attribute may potentially still be selected over that other attribute. However, even if such additional factors are used in step 330, the selection process may be implemented so as to be primarily based on the normalized entropy calculated in step 323, so that attributes with higher normalized entropy tend to be selected over attributes with lower normalized entropy.

Referring again to FIG. 2, step 203 may include transmitting, to a user device operated by the user, an inquiry for user preference regarding the selected vehicle attribute. The inquiry may be transmitted by the computer system 110 to user device 121 over network 130 and may serve as request for the user preference. In some examples, the inquiry may include or otherwise indicate an inquiry message requesting the user to supply the user preference. The inquiry message may be presented to the user through user device 121, and may be presented in a natural language format.

The inquiry message may be a question asking for a response indicative of user preference regarding the selected vehicle attribute (e.g., "what vehicle condition are you looking for?" or "what body style are you looking for?", "indicate the vehicle condition you are looking for" or "please select the vehicle condition you are looking for"). Such a question may be in any suitable form. For example, the question may have an interrogative grammatical structure (e.g., "what vehicle condition are you looking for?") or a non-interrogative grammatical structure (e.g., "indicate the vehicle condition you are looking for").

The inquiry and inquiry message may, but do not necessarily need to, recite the selected vehicle attribute. In some implementations, or for some vehicle attributes, the inquiry message may ask about a subject matter that is related to the selected vehicle attribute such that an answer to the inquiry message may still indicate a user preference for certain values of the selected vehicle attribute. For example, if the selected vehicle attribute is "price," then the inquiry message may ask about a desired monthly payment (e.g., a desired monthly payment for car financing) instead of price. In this example, a response to the inquiry message that is indicative of a certain monthly payment may indicate a user preference for a certain price, based on a correspondence between the monthly payment and price, and based further on default or user-specified values for loan parameters (e.g., term length and interest rate).

The inquiry message may be a general question for the selected vehicle attribute without directly asking about specific values of the selected vehicle attribute. That is, question may be in the form of "what vehicle condition are you looking for?" or "select a vehicle condition" that pertains to the selected vehicle attribute in general. A question phrased in such a manner permits the response from the user to indicate a selection of one or more values of the attribute. By contrast, a question that pertains to specific values of the attribute, such as "would you like a coupe?" or "blue exterior color?" or "newer than 2007?" would suggest a binary (e.g., "yes" or "no") answer regarding specific value(s) of the selected vehicle attribute. By asking a general question, the content of the user's response may be flexible, and not limited to certain formats such as a binary, yes-or-no response.

To present the inquiry message to the user, the computer system 110 may cause the inquiry to be presented through a user interface, such as a graphical user interface displayed on the user device 121 operated by the user, and/or a voice user interface implemented by the user device 121. For example, the computer system 110 may transmit a message to the user device 121 controlling, or otherwise causing, the user device 121 to present the inquiry in response to receive the message. The message may include the inquiry to be presented (e.g., visually displayed and/or audibly presented).

In some examples, the user interface by which the inquiry is presented may be a graphical user interface displayed on a web browser or other application executed on the user device 121. If the user device 121 is a mobile computer device, the graphical user interface may be provided by a mobile app executed thereon. In some examples, the user device 121 may include a voice assistant, and the user interface may be broadcast to the user in audio form using the voice assistant.

Examples of a graphical user interface are provided in FIGS. 5A and 5B, which are discussed in greater detail below. However, in general, in step 205, the computer system 110 may present the inquiry to the user of the user device 121 via any suitable method, involving any suitable user interface.

Step 204 may include receiving, from the user device, a response to the inquiry. The response may indicate the user preference regarding the selected vehicle characteristic. In order for the computer system 110 to receive the response, the user may, for example, input the response using a user interface (e.g., graphical user interface or a voice user interface) provided at the user device 121, which may be the same user interface discussed above in relation to step 203, or a separate user interface.

To generate the response that is received in step 204, the user may input certain value(s) of the selected attribute, to indicate that those value(s) are desired by the user. The client device 121, upon receiving an input from the user indicating the desired value(s), may transmit the response to the computer system 110 over network 130 indicating the desired value(s) indicated by the user input.

As noted above, the inquiry message may be a question for soliciting a response that identifies one or more value(s) desired by the user. Therefore, the user interface may permit the user to input various values or combinations of values to be indicated as desired. For example, in implementations in which a graphical user interface is utilized by the user to generate the response, the graphical user interface may include interactive graphical user interface elements (e.g., buttons, drop down lists, selection menus, text inputs, slider bars, and/or numerical value selectors) through which the user may select one or more desired value(s), and input the selection. Examples of such implementations are illustrated in FIGS. 5A and 5B, discussed below.

The user interface may permit the user to make a selection from among the values used in step 322A in the case of categorical attributes, or the bins used in step 322B in the case of quantitative variables, to be indicated in the response transmitted by the client device 121 as being desired. However, there is no requirement for the desired value(s) selected by the user to match the values (or bins) in step 322A or 332B. For example, the user interface may permit the user to input desired value(s) that represent certain values of the selected vehicle attribute (e.g., a value of monthly payment that represents values of price), or desired value(s) that are different from the bins used in step 322B. The values and bins in steps 322A and 322B are used for selection of the vehicle attribute for purposes of generating the inquiry, and do not necessarily need to be used for narrowing down the candidate set of vehicles (e.g., as in step 205, described below).

For quantitative attributes, the user interface may permit a selection of ranges, including open ended ranges. For example, if price is the selected attribute, the user may enter a price range between two values, or a price range that is greater than or less than a certain value.

In some examples, the response that is received in step 204 may indicate the absence of a user preference regarding the selected vehicle attribute. For example, the user interface may permit the user to enter a "skip" command, which may indicate to the computer system 110 that the vehicle attribute is to be skipped. Examples of user interfaces permitting entry of a "skip" command are shown in FIGS. 5A and 5B.

Step 205 may include adjusting the candidate set of vehicles based on the response, if the response indicates a user preference for only a portion of vehicles in the candidate set. Step 205 may include determining whether the response indicates the exclusion of vehicles having one or more values of the selected attribute from further consideration, and, upon determining that the response does indicate the exclusion of vehicles having one or more values of the selected attribute from further consideration, adjusting the candidate set of vehicles to exclude vehicles having those one or more values of the selected attribute.

In some examples, the response may indicate that certain value(s) of the selected attribute are desired by the user. Based on such a response, the computer system 110 may determine that vehicles of the candidate set having any value of the selected attribute other than the aforementioned desired value(s) are to be excluded. That is, an indication of certain values of an attribute being desired may, in various implementations, be treated as a user command for exclusion of vehicles having all other values of the attribute.

If the response indicates a "skip" command, then the candidate set of vehicles may be maintained without exclusion of any vehicles therefrom.

Step 206 may include determining whether another iteration of steps 202 to 205 is to be performed. This determination may be based on one or more of factors. For example, the computer system 110 may reiterate the process (206: YES) until a termination condition has been satisfied. The termination condition may be, for example, the completion of a predetermined number of total iterations, a quantity of vehicles remaining in the candidate set (after any exclusions made in accordance with the response(s) have been applied), a percentage of vehicles remaining in the candidate set relative to the initial candidate set as determined in step 201 (after any exclusions made in accordance with the response(s) have been applied), the values of the estimates of normalized entropy for the remaining vehicle attributes (e.g., whether any remaining vehicle attribute has an estimated normalized entropy satisfying a certain threshold), or a combination of conditions including at least one of the foregoing.

As noted above, if the process is reiterated, the vehicle attribute that is selected in step 202 may be excluded from selection in the same step in each subsequent iteration, such that step 202 results in the selection of a different vehicle attribute in every subsequent iteration. Furthermore, it is also possible for a subsequent iteration to terminate prior to step 206. For example, step 202 may include conditions for skipping to step 207 without performance of steps 203 through 206.

Step 207 may include presenting a recommendation of one or more vehicles. The recommendation may indicate or represent the candidate set as reduced in the prior steps or one or more vehicles from the candidate set, and may be presented to the user device 121. In some examples, a list of one or more recommended vehicles or a portion of the list may be transmitted to the user device 121 for display on the user device 121 (see FIG. 6). In other examples, the recommendation may indicate or represent the list of vehicles by being a hyperlink to a webpage that includes the list of one or more recommended vehicles, or a summary representation of the one or more recommended vehicles (such as a list of each unique combination of make and model represented in the one or more recommended vehicles).

While the methods of FIG. 2-3 have been discussed with reference to embodiments in which computer system 110 and user device 121 are separate from one another (e.g., remotely connected through network 130), it is also possible the computer system 110 and the user device 121 to be the same computer system or the same computing device, in which case any information between computer system 110 and user device 121 that may take place over network 130 may be communicated between applications running on the same computer system or computing device. Furthermore, it is understood that the methods of FIGS. 2-3 are applicable to products other than vehicles.

Figure 5A:
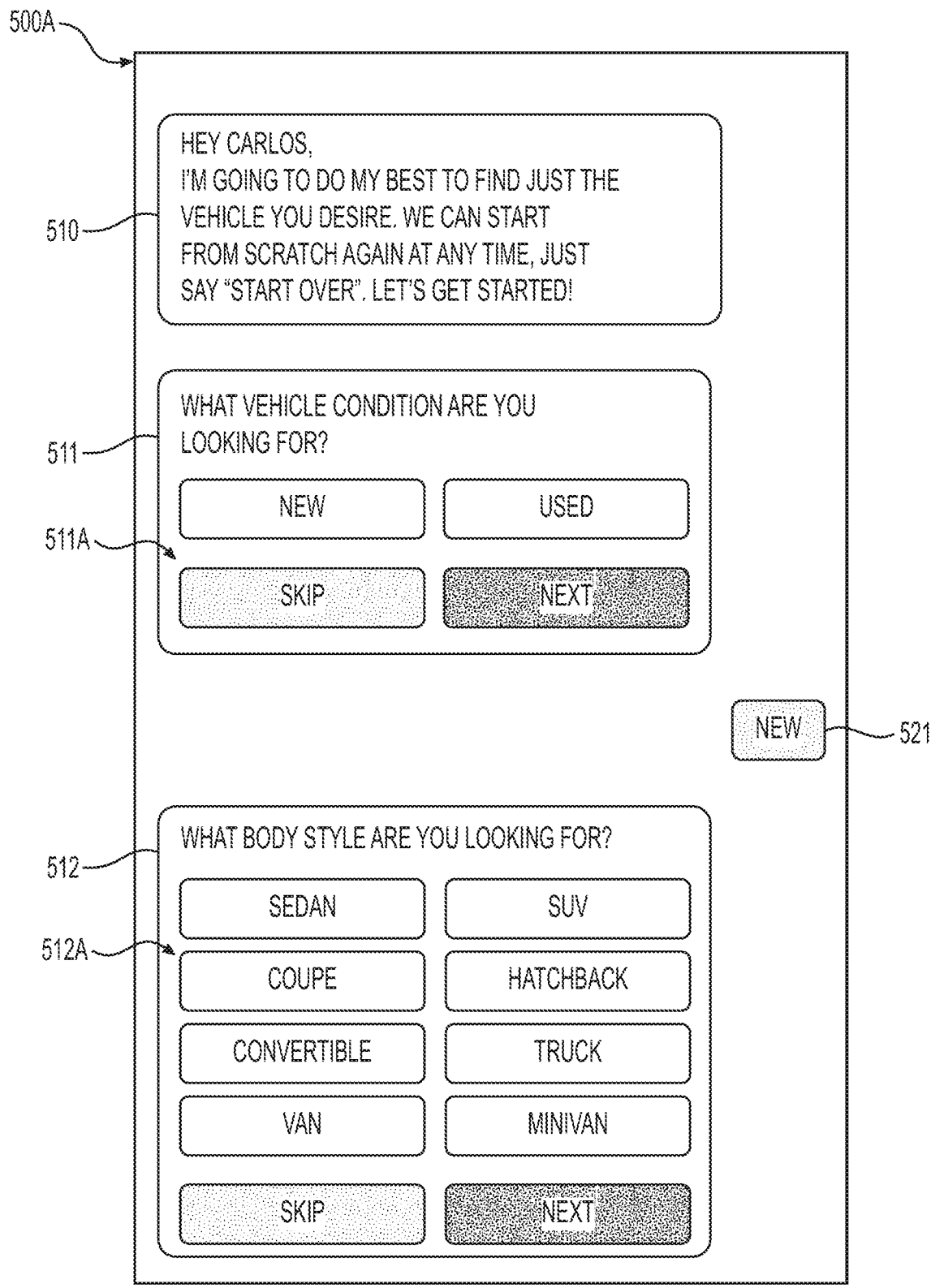
FIGS. 5A-5B depict examples of chatbot sessions, according to one or more embodiments.
Figure 5B:
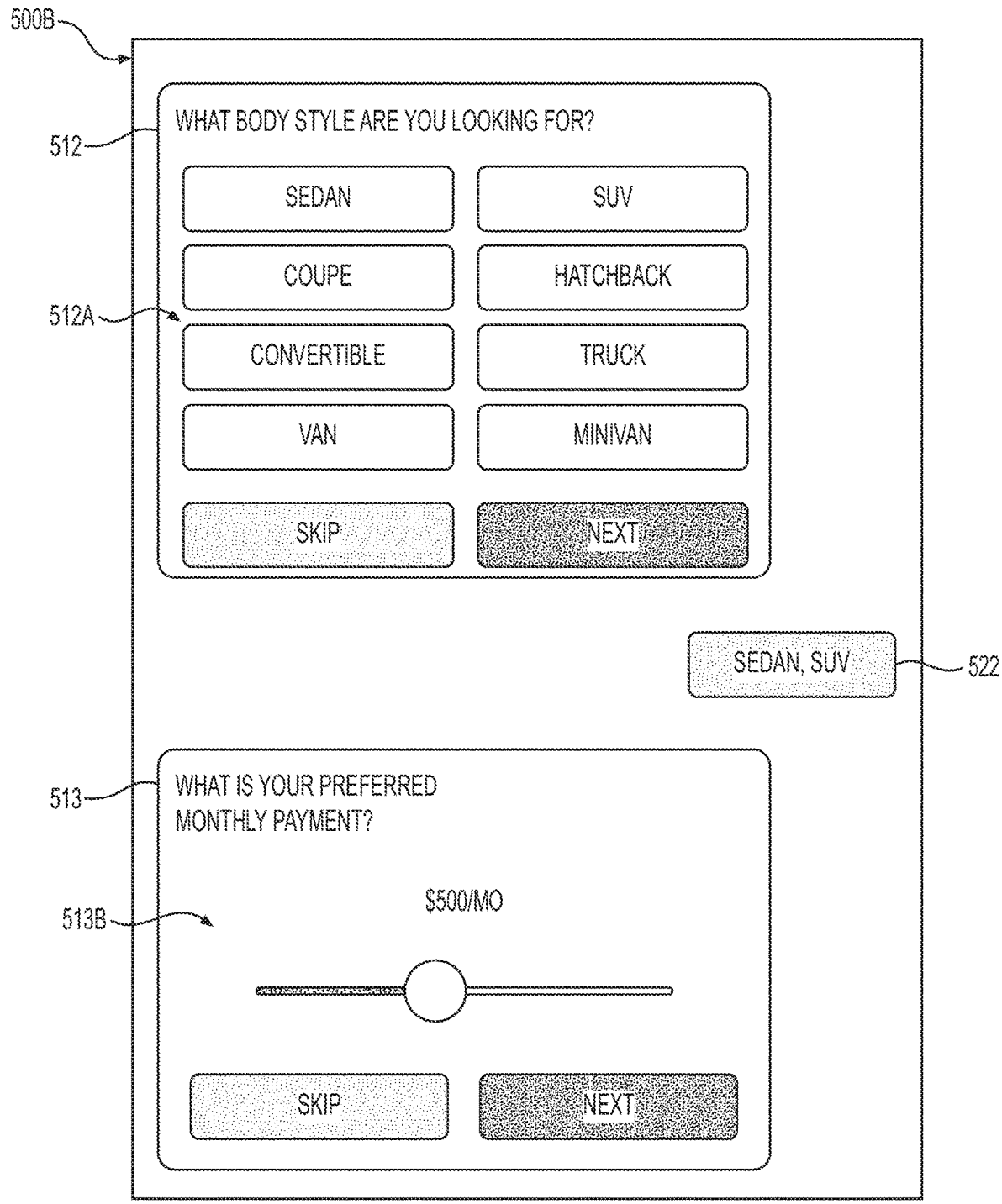
Figure 6:
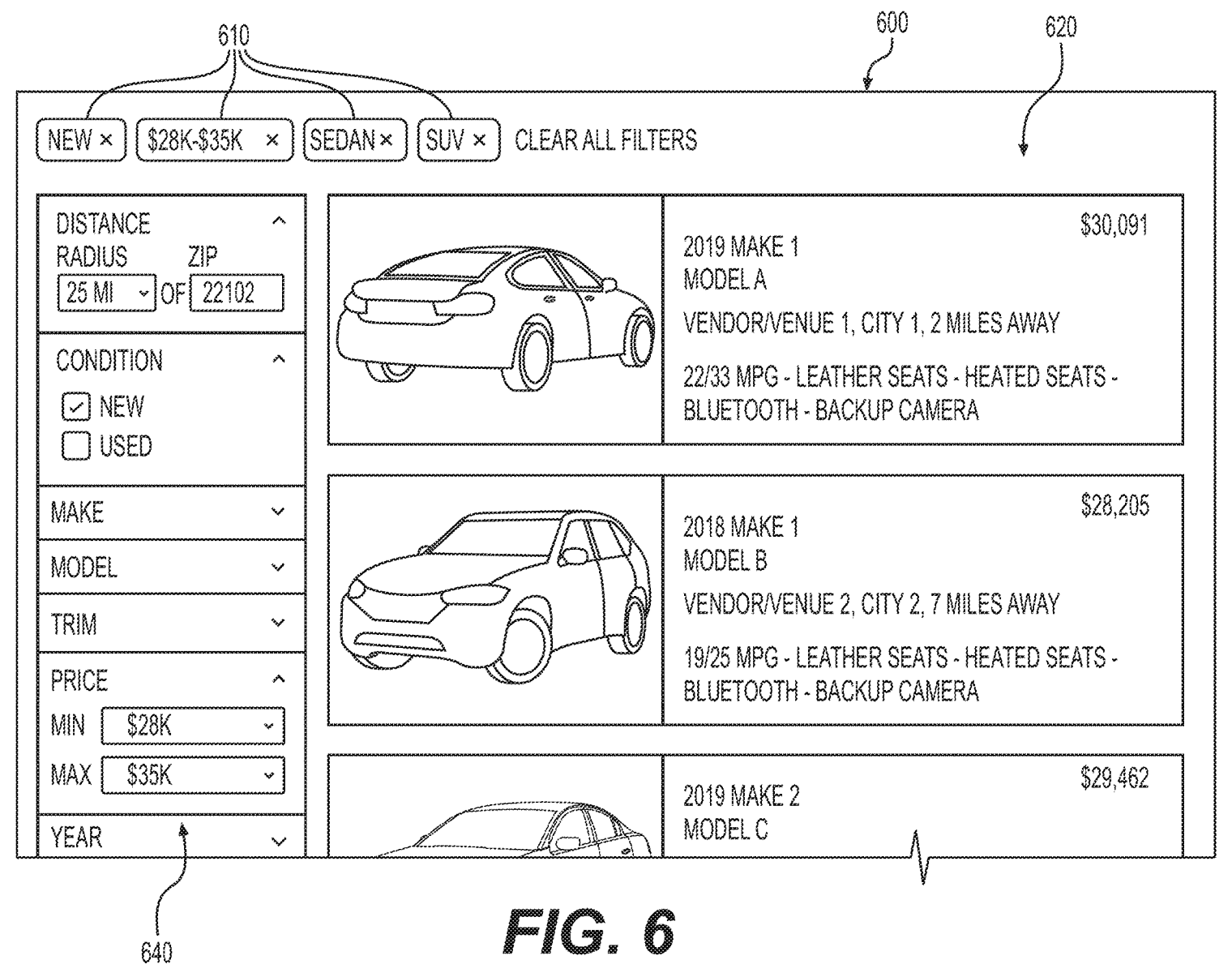

FIGS. 5A, 5B, and 6 illustrate examples of user interactions with an artificial-intelligence interactive agent. The interactive agent may be a chatbot provided by a service of the computer system 110. The chatbot may have the ability to perform the method of FIGS. 2 and 3, among other functionalities. The chatbot may be programmed to interact with a user to help the user select find a vehicle to purchase or lease.

The respective screens 500A and 500B of FIGS. 5A and 5B may be displayed on a client application executed by a user device (e.g., user device 121). The client application may be a web browser, a web browser extension, a text-messaging application (e.g., SMS messaging application), or an application (e.g., mobile app) designed to interface with the chatbot. The client application may have a user interface enabling the user to interact with the chatbot by inputting text queries.

The user or the chatbot may initiate a conversation session. In FIG. 5A, messages 510, 511, 512, 513, 521, and 522 may be communicated as part of an interactive session between the chatbot and the user. For example, at the start of the session, the chatbot may present a message 510 that presents information about the functionality of the chatbot.

The chatbot may then output message 511, which may include a question ("What vehicle condition are you looking for?"). To generate message 511, the chatbot may perform the method illustrated in FIG. 2, to select the attribute of vehicle condition pursuant to step 202. That is, in the example interaction shown in FIG. 5A, the attribute of vehicle condition may be determined, according to step 202 and the method shown in FIG. 3, to be the optimal vehicle inquiry to ask the user about. For example, the attribute of vehicle condition may have the highest estimate of normalized entropy among a plurality of vehicle attributes that may be selected. After selecting the attribute of vehicle condition, the chatbot may cause the computer system 110 to transmit an inquiry to the user device 121, so as to cause the user device 121 to output the message 511 on a graphical user interface.

As shown, the message 511 may include a selection interface 511A including interface elements permitting the user to select a response. Such interface elements may include a corresponding interface element (e.g., intractable button) for each value of the attribute of vehicle condition represented in the candidate set of vehicles. In this example, represented values are the values of "new" and "used." The selection interface 511A may include a "skip" interface element, permitting the user to indicate that he or she has no preference, and a "next" interface element, which permits the user to enter the selected input. For example, the user may select one or both of "new" and "used" and press the "next" interface element to submit the selection. In the instantly illustrated example, the user has selected the value of "new," as indicated by response 521.

As described above in relation to step 204 of FIG. 2, the user device 121 may receive a user input (indicating submitting the selection of "new," in this example) through the user interface, and transmit an inquiry response to the computer system 110 indicating the user input. Upon receiving the user input (step 204), the chatbot may perform step 205. In performing step 205, the chatbot may eliminate the vehicles in the candidate set of vehicles that do not have the value of "new" for the attribute of "vehicle condition," and determine that another iteration should be performed (step 206:YES).

In the second iteration, the chatbot may determine that, out of the remaining vehicle attributes other than the attribute of vehicle condition, the attribute of body style is the most optimal attribute to ask the user about. For example, the chatbot may determine that, based on the data set of vehicles in the candidate set of vehicles that have the value of "new" for the attribute of vehicle condition, the attribute of body style has the highest estimated of normalized entropy. As shown in FIG. 5A, the chatbot may cause the client device 121 to display message 512 including the question of "what body style are you looking for?".

Message 512 may include a selection interface 512A listing the different values for the attribute of body style, and permitting the user to select one or more of such value. In the instant example, as shown in message 522 in FIG. 5B, the user selects "sedan" and "SUV." Accordingly, the chatbot may once again adjust the candidate set of vehicles, in accordance with step 205 of FIG. 2, so as to exclude vehicles that do not have "sedan" or "SUV" for the attribute of body style, and proceed to a third iteration.

In the third iteration, the chatbot presents a message 513 with the question of "what is your preferred monthly payment." The message may be generated upon selection of price as the vehicle attribute to ask the user about. As described above in relation to step 203, the inquiry may pertain to a topic that is related to the selected vehicle attribute. In this example, the inquiry pertains to monthly payment, which may be related to the attribute of vehicle price based on a correspondence between monthly payment and price. The selection interface 513B may include a slider permitting a user to select a value within a range, and submit the selected value. For quantitative attributes, the selection of a particular value may be interpreted as a selection of a bin or a range. For example, a particular value of monthly payment may correspond to a particular value of price, which may correspond to a bin or range of values.

FIG. 6 illustrates an example of a vehicle listing interface 600 displaying a representation of a recommendation of one or more vehicles. The vehicle listing interface 600 may be displayed on a user device (e.g., user device 121) upon determining one or more recommended vehicles in according with step 207 of FIG. 2. The computer system 110 may transition the user from the interface shown in FIGS. 5A and 5B to the vehicle listing interface 600, or otherwise direct the user to the vehicle listing interface 600 by, for example, a hyperlink. In some examples, the user interface 600 may be a web page transmitted by the computer system 110 over network 130 for display on user device 121. The vehicle listing interface 600 may include a list of vehicles 620. The list of vehicles may be selected as vehicles that satisfy one or more characteristics specified on selection panel 640. Selection of vehicle characteristics from the selection panel 640 may be further indicated as filters 610.

According to some embodiments, upon completion of step 207 of FIG. 2, the computer system 110 may transmit the vehicle listing interface 600 (as, for example, a web page) to user device 121 such that the filters 610 are pre-set in accordance with the response(s) received from the user during the method of FIG. 2. That is, the user preferences indicated during the method of FIG. 2 may be converted into search filters of the vehicle listing interface 600, and the resulting list of vehicles 620 would include the one or more vehicle recommendations resulting from the method of FIG. 2. In the illustrated example, the interactions shown in FIGS. 5A and 5B may result in the filters 610 of "new", "$28 k-$35 k", "sedan", and "SUV" being applied, as shown in FIG. 6, filtering the list of vehicles to new vehicles that are either sedans or SUVs and have a price in the range of $28 k-$35 k. The range of $28 k-$35 k may be a bin of values used in step 322B, or a range that is chosen based on the response received in step 204.

The methodologies described in this disclosure, including the methodologies for selecting a vehicle attribute for inquiry, permit an efficient series of questions to be generated for purposes of learning a user's preferences as to various product attributes. In particular, by analyzing the distributional characteristics of the attribute or derived measures such as normalized entropy, it becomes possible to direct the questions to particular vehicle attributes for which there is low certainty as to the user's preferences. Therefore, it is possible to realize an efficient user-question process that obtains a high amount of information using a low number of questions.

The methodologies for selecting the vehicle attribute for inquiry are compatible with different manners of the inquiry and different forms of responses to the inquiry. For example, the inquiry may elicit a binary (e.g., "yes or no") response, a response indicating a selection of multiple possible values of an attribute, or a response indicating no preference. Since the methodologies for selecting the vehicle attribute for inquiry does not rely on a particular form of inquiry or response to the inquiry, the methodologies may be applied to different manner of user interactions.

Furthermore, the methodologies described in this disclosure may be incorporated into an interactive agent such as a chatbot, thereby improving the effectiveness of the chatbot in providing product recommendations.

In general, any process discussed in this disclosure that is understood to be computer-implementable, such as the processes shown in FIGS. 2-3, may be performed by one or more processors of a computer system, such as computer system 110 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as computer system 110 or user devices 120, may include one or more computing devices. If the one or more processors of the computer system is implemented as a plurality of processors, the plurality of processors may be included in a single computing device or distribute among a plurality of computing devices. If a computer system comprises a plurality of computing devices, the memory of the computer system may include the respective memory of each computing device of the plurality of computing devices.

Figure 7:
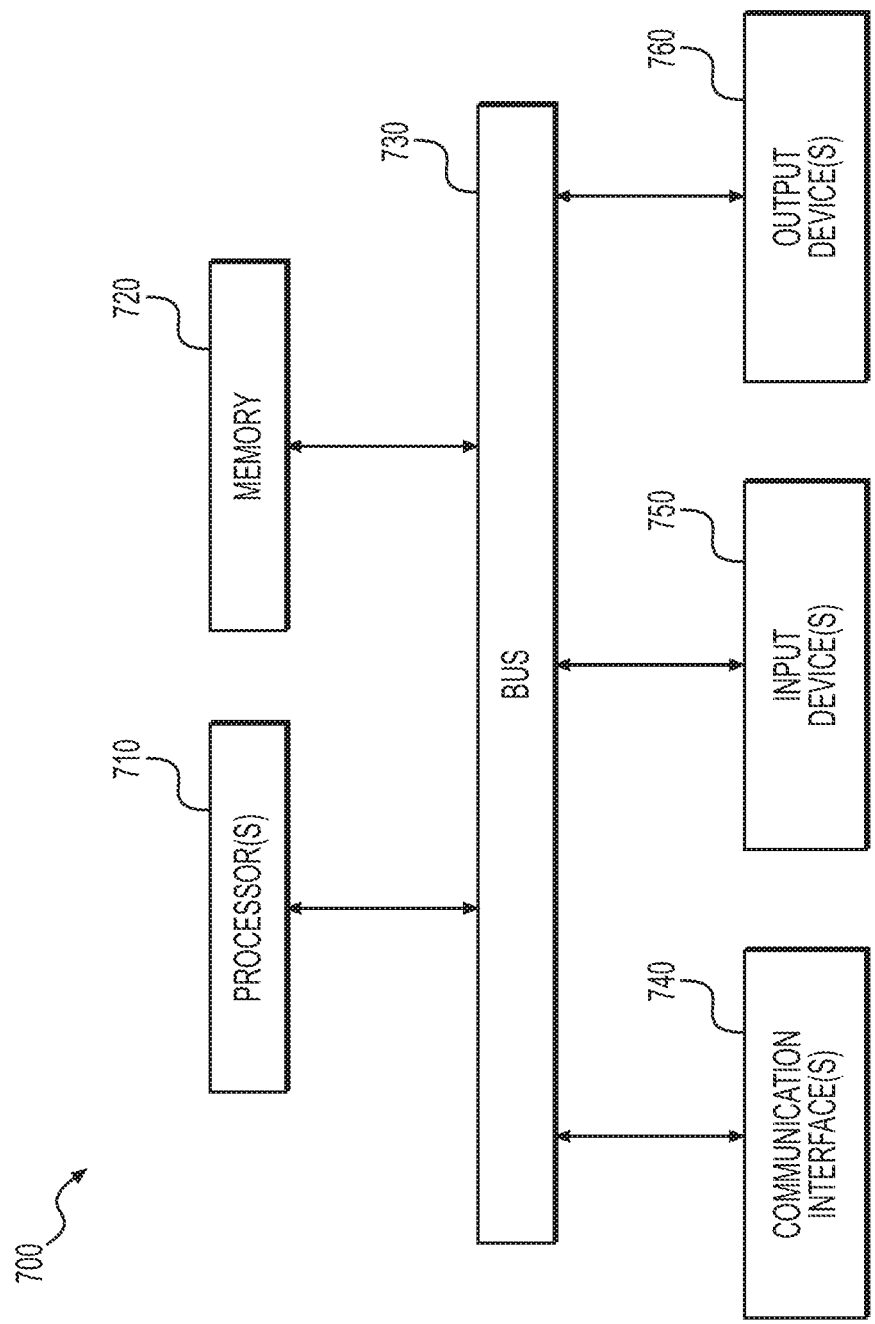
FIG. 7 depicts an example of a computing device, according to one or more embodiments.

FIG. 7 illustrates an example of a computing device 700 of a computer system. The computing device 700 may include processor(s) 710 (e.g., CPU, GPU, or other processing unit), a memory 720, and communication interface(s) 740 (e.g., a network interface) to communicate with other devices. Memory 720 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 720. The computing device 700 may, in some embodiments, further include input device(s) 750 (e.g., a keyboard, mouse, or touchscreen) and output device(s) 760 (e.g., a display, printer). The aforementioned elements of the computing device 700 may be connected to one another through a bus 730, which represents one or more busses. In some embodiments, the processor(s) 710 of the computing device 700 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for determining vehicle recommendations based on user interaction, the method comprising:
   determining respective frequency distributions of a plurality of vehicle attributes, the frequency distributions being determined based on occurrences of values of the plurality of vehicle attributes in a set of vehicles;
   selecting a vehicle attribute from the plurality of vehicle attributes based on the frequency distributions of the plurality of vehicle attributes;
   transmitting, to a user device, an inquiry for user preference regarding the selected vehicle attribute;
   receiving, from the user device, a response indicating the user preference; and
   presenting, to the user device, a recommendation of one or more vehicles determined based on the received response.

2. The method of claim 1, wherein the selecting the vehicle attribute includes:
   determining respective estimates of normalized entropy of the plurality of vehicle attributes based on the respective frequency distributions; and
   selecting the vehicle attribute from the plurality of vehicle attributes based on the respective estimates of normalized entropy.

3. The method of claim 2, wherein
   the respective frequency distributions are percentage distributions, and
   in the determining the respective estimates of normalized entropy, the respective frequency distributions are used as respective probability mass functions of the plurality of vehicle attributes.

4. The method of claim 2, wherein the selecting the vehicle attribute from the plurality of vehicle attributes selects a vehicle attribute having a highest estimate of normalized entropy out of the respective estimates of normalized entropy of the plurality of vehicle attributes.

5. The method of claim 2, wherein
   the plurality of vehicle attributes includes a categorical attribute, and
   for the categorical attribute, the respective estimate of normalized entropy is normalized based on a total number of values of the categorical attribute that appear at least once in the set of vehicles.

6. The method of claim 1, wherein
   the plurality of vehicle attributes includes a quantitative attribute, and
   the determining the respective frequency distributions includes determining a frequency distribution of the quantitative attribute by
      grouping values of the quantitative attribute into bins, each of the values of the quantitative attribute corresponding to a respective vehicle in the set of vehicles, and
      determining a respective frequency of each of the bins, to obtain the frequency distribution of the quantitative attribute.

7. The method of claim 6, wherein the determining the frequency distribution of the quantitative attribute includes:
   prior to the grouping the values of the quantitative attribute into bins, processing the values of the quantitative attribute by capping one or more outlier values.

8. The method of claim 1, wherein
   the user preference indicates a preference for one or more values of the selected vehicle attribute,
   the method further includes excluding, from the set of vehicles, vehicles having none of the one or more values for the selected vehicle attribute, to obtain a reduced set of vehicles, and
   the vehicle recommendation includes one or more vehicles of the reduced set of vehicles.

9. The method of claim 1, wherein the plurality of vehicle attributes include one or more of: body style, exterior color, interior color, number of doors, vehicle condition, engine types, transmission type, fuel type, mileage, price, year, or fuel economy.

10. The method of claim 1, wherein
    the selected vehicle attribute is a first vehicle attribute,
    the user preference indicates a preference for one or more values of the selected vehicle attribute, and
    the method further includes:
       excluding, from the set of vehicles, vehicles having none of the one or more values for the selected vehicle attribute, to obtain a reduced set of vehicles;
       determining second respective frequency distributions of a second plurality of vehicle attributes, the second frequency distributions being determined based on occurrences of values of the plurality of vehicle attributes in the reduced set of vehicles, the second plurality of vehicle attributes each being a vehicle attribute other the first vehicle attribute;
       selecting a second vehicle attribute from the second plurality of vehicle attributes based on the second frequency distributions of the plurality of vehicle attributes;
       presenting, to the user device, a second inquiry for user preference regarding the second vehicle attribute, and
       receiving, from the user device, a second response indicating the user preference regarding the second vehicle attribute, and
    the recommendation of one or more vehicles is determined based further on the second response.

11. A computer system for determining vehicle recommendations based on A user interaction, the computer system comprising:
    a memory storing instructions; and
    one or more processors configured to execute the instructions to perform operations including:
       determining respective estimates of normalized entropy of a plurality of vehicle attributes of vehicles in a set of vehicles;
       selecting a vehicle attribute from the plurality of vehicle attributes based on the estimates of normalized entropy;
       transmitting, to a user device, an inquiry for user preference regarding the selected vehicle attribute;
       receiving, from the user device, a response indicating the user preference; and
       presenting, to the user device, a vehicle recommendation determined based on the received response.

12. The computer system of claim 11, wherein the selecting the vehicle attribute from the plurality of vehicle attributes selects a vehicle attribute having a highest estimate of normalized entropy out of the respective estimates of normalized entropy of the plurality of vehicle attributes.

13. The computer system of claim 11, wherein
the plurality of vehicle attributes includes a categorical attribute, and
for the categorical attribute, the respective estimate of normalized entropy is normalized based on a total number of values of the categorical attribute that appear at least once in the set of vehicles.

14. The computer system of claim 11, wherein in the determining the respective estimates of normalized entropy, the respective estimates of normalized entropy are determined based on frequency distributions of the plurality of vehicle attributes, the frequency distributions being based on occurrences of values of the plurality of vehicle attributes in the set of vehicles.

15. The computer system of claim 14, wherein
the respective frequency distributions are percentage distributions, and
in the determining the respective estimates of normalized entropy, the respective frequency distributions are used as respective probability mass functions of the plurality of vehicle attributes.

16. The computer system of claim 14, wherein
the plurality of vehicle attributes includes a quantitative attribute, and
the determining the respective estimates of normalized entropy includes determining a frequency distribution of the quantitative attribute by
grouping values of the quantitative attribute into bins, each of the values of the quantitative attribute corresponding to a respective vehicle in the set of vehicles, and
determining a respective frequency of each of the bins, to obtain the frequency distribution of the quantitative attribute.

17. The computer system of claim 16, wherein the determining the frequency distribution of the quantitative attribute includes:
prior to the grouping the values of the quantitative attribute, processing the values of the quantitative attribute by capping one or more outlier values.

18. The computer system of claim 11, wherein
the user preference indicates a preference for one or more values of the selected vehicle attribute,
the operations further include excluding, from the set of vehicles, vehicles having none of the one or more values for the selected vehicle attribute, to obtain a reduced set of vehicles, and
the vehicle recommendation includes one or more vehicles of the reduced set of vehicles.

19. The computer system of claim 11, wherein the plurality of vehicle attributes include one or more of: body style, exterior color, interior color, number of doors, vehicle condition, engine types, transmission type, fuel type, mileage, price, year, or fuel economy.

20. A computer system for implementing an artificial-intelligence interactive agent for determining vehicle recommendations based on user interaction, the computer system comprising:
a memory storing instructions; and
one or more processors configured to execute the instructions to perform operations including:
determining respective frequency distributions of a plurality of vehicle attributes describing vehicles in a set of vehicles, the frequency distributions being determined based on occurrences of values of the plurality of vehicle attributes in the set of vehicles;
determining respective estimates of normalized entropy of the plurality of vehicle attributes based on the respective frequency distributions;
selecting a vehicle attribute from the plurality of vehicle attributes based on the respective estimates of normalized entropy;
transmitting, to a user device, an inquiry for user preference regarding the selected vehicle attribute;
receiving, from the user device, a response indicating the user preference; and
transmitting, to the user device, a web page including a list of one or more vehicles from the set of vehicles, the list having filters set in accordance with the user preference.

* * * * *